Nov. 19, 1968  F. H. P. SULLY  3,411,532
CONSTANT FLOW RATE ORIFICE DEVICES
Filed Aug. 9, 1965  2 Sheets-Sheet 1
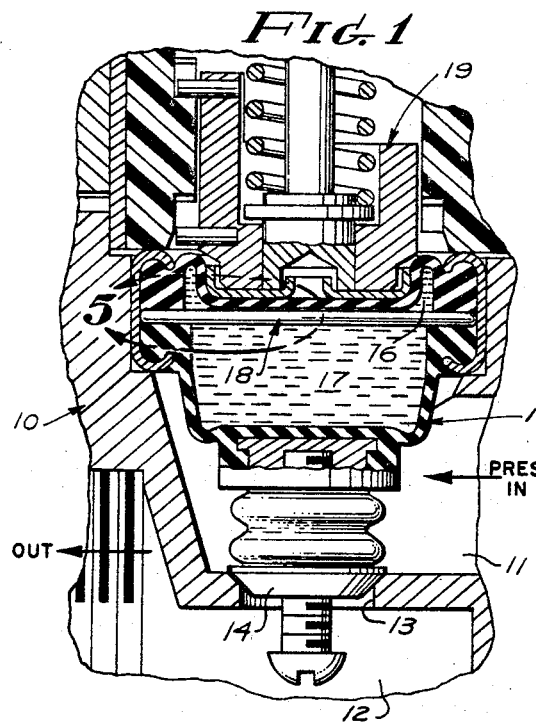
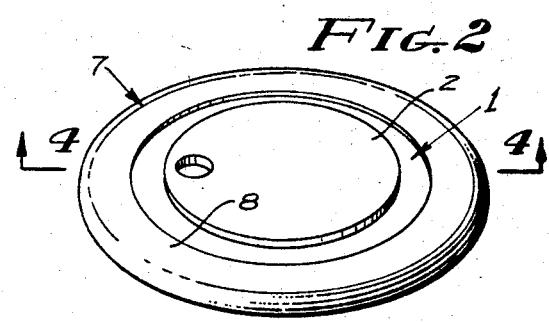
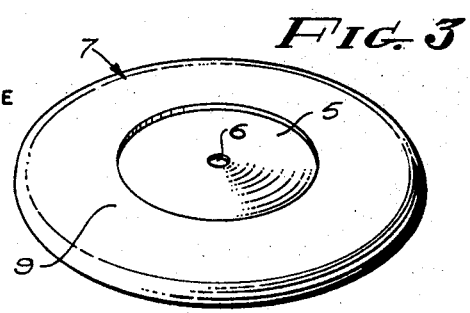
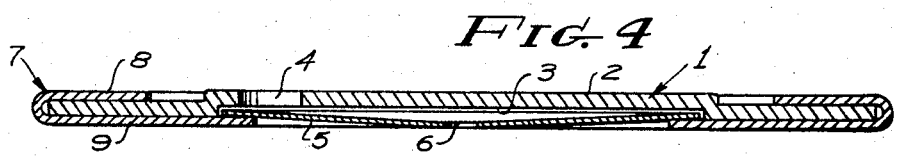
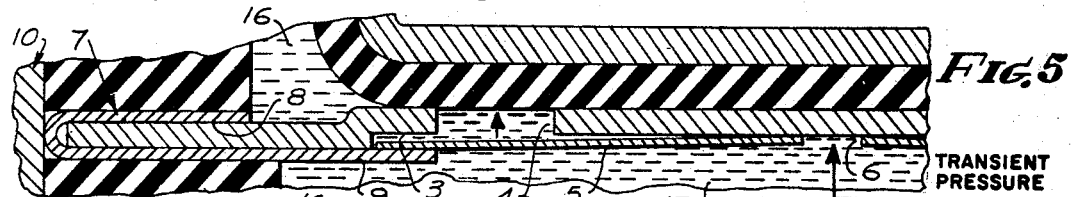
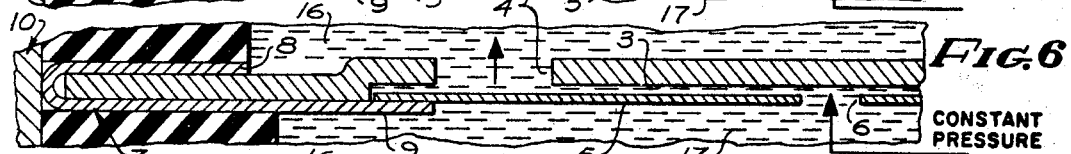
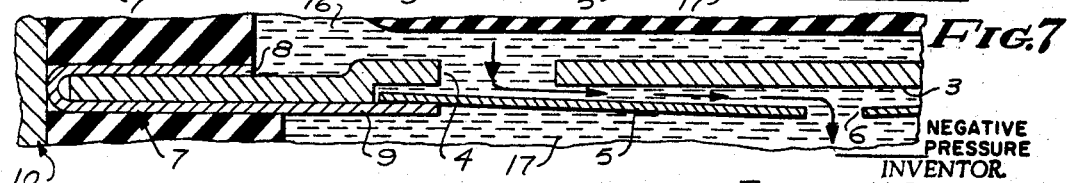
INVENTOR.
FRANK H. P. SULLY
BY
ATTORNEYS Nov. 19, 1968   F. H. P. SULLY   3,411,532
CONSTANT FLOW RATE ORIFICE DEVICES
Filed Aug. 9, 1965   2 Sheets-Sheet 2
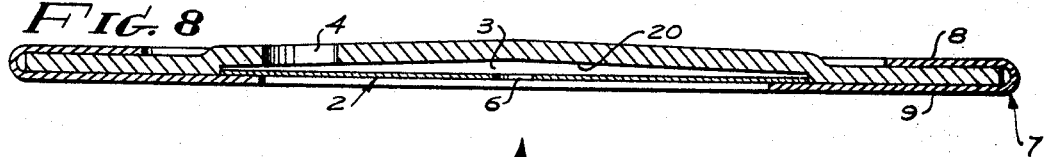
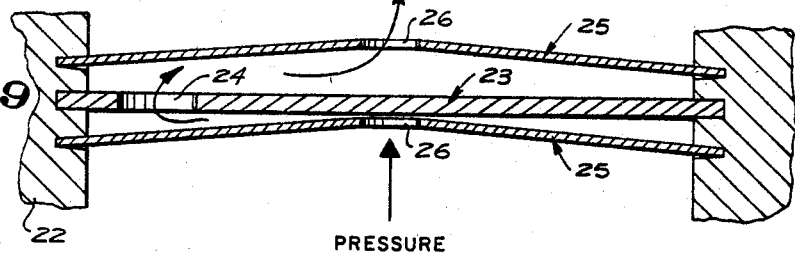
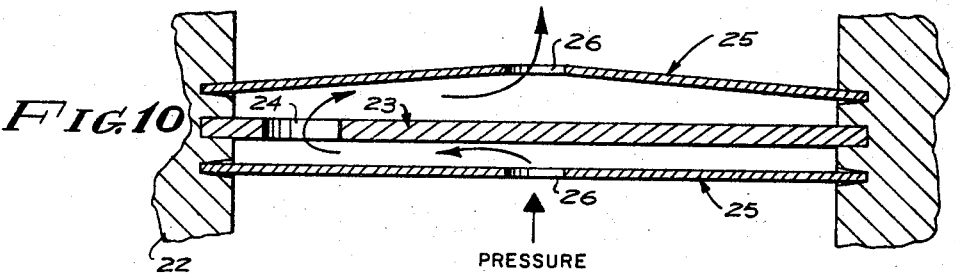
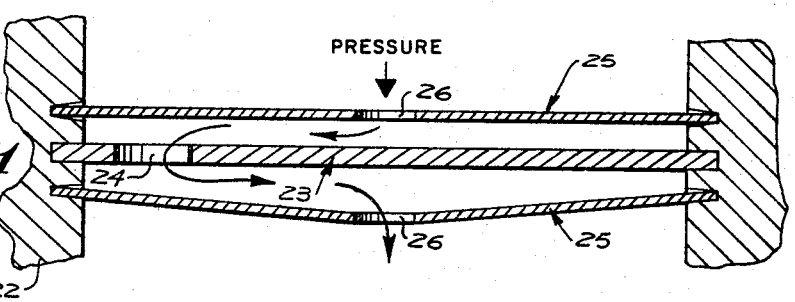
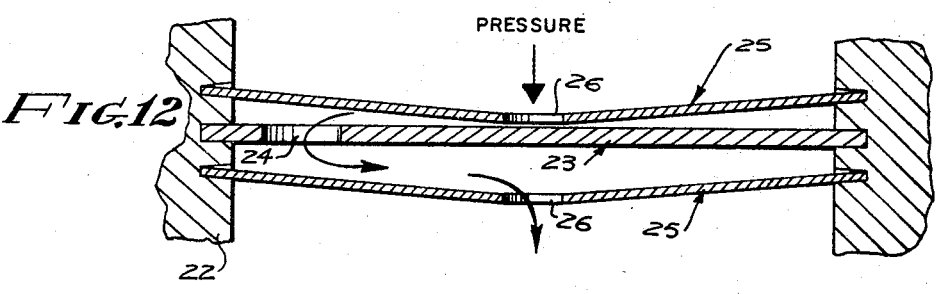
INVENTOR.
FRANK H. P. SULLY
BY
ATTORNEYS

United States Patent Office 3,411,532
Patented Nov. 19, 1968

3,411,532
CONSTANT FLOW RATE ORIFICE DEVICES
Frank H. P. Sully, La Mirada, Calif., assignor to Western Brass Works, Los Angeles, Calif., a corporation of California
Filed Aug. 9, 1965, Ser. No. 478,235
3 Claims. (Cl. 137—517)

ABSTRACT OF THE DISCLOSURE

An apparatus to provide a constant flow rate over a wide range of varying pressures by using flexible and fixed disc orifices. A modified form of the apparatus permits control of flow in opposite directions.

---

This invention relates to constant flow rate orifice devices.

An object of this invention is to provide an orifice device which will pass a fluid at an essentially constant rate throughout a wide range of fluid pressures.

A further object is to provide an orifice device which will stop flow of fluids therethrough if the device is subjected to suddenly applied pressure surges.

A still further object is to provide a constant flow rate orifice device which may be arranged to operate in response to flow in one direction only therethrough and permit full flow in the opposite direction, or to respond to flow in either direction therethrough.

Another object is to provide a constant flow rate orifice device which is particularly adapted for incorporation in sequencing valves of the type shown in a co-pending application Ser. No. 405,090, filed Oct. 20, 1964, now Patent No. 3,241,569 issued Mar. 22, 1966, for Sequencing Valve With Integrated Surge Control and Pressure Drop Actuated, by Frank H. P. Sully and Willard H. Brink, however, the orifice device having other fields of use.

With the above and other objects in view as may appear hereinafter, reference is directed to the accompanying drawings, in which:

FIGURE 1 is a fragmentary view showing a sequencing valve incorporating the invention.

FIGURE 2 is a perspective view showing one side of the constant flow rate orifice device.

FIGURE 3 is a perspective view showing the other side thereof.

FIGURE 4 is an enlarged transverse sectional view thereof taken through 4—4 of FIGURE 2.

FIGURE 5 is a still further enlarged fragmentary sectional view taken within circle 5 of FIGURE 1 showing the orifice device in its closed position when subjected to transient pressure.

FIGURE 6 is a similar fragmentary sectional view showing the orifice device when subjected to constant pressure.

FIGURE 7 is a similar fragmentary sectional view showing the device when subjected to negative pressure.

FIGURE 8 is a transverse sectional view showing a modified form of the orifice device.

FIGURES 9, 10, 11 and 12 are transverse sectional views of a further modified form of the orifice device, the surrounding walls of the device being shown fragmentarily, the views showing the modified orifice device under various conditions of operation.

Reference is first directed to FIGURES 2, 3 and 4. The orifice device here illustrated includes a fixed or relatively rigid plate 1 of circular configuration and provided with a central offset portion 2 forming at one side a shallow circular chamber 3. An orifice 4 located eccentrically with respect to the chamber pierces the plate 1.

Fitted in the chamber 3 is a flexure plate 5 of circular configuration and formed of relatively thin material. For the purposes of the embodiment of the orifice device employed in FIGURE 1, as will be brought out hereinafter, the flexure plate may be a Belleville washer. The flexure plate is provided with a central orifice 6.

The fixed plate 1 is surrounded by a retainer band 7 including an internal flange 8 which overlies one side of the fixed plate 1, and a second internal flange 9 which overlies the other side of the fixed plate. The flange 9 extends radially inward to a point slightly beyond the margin of the chamber 3 so as to engage the margin of the flexure plate 5 and retain the flexure plate in the chamber 3.

For purposes of illustrating one application of the orifice plate, reference is directed to FIGURE 1 which is a fragmentary view of a sequencing valve more fully set forth in the aforementioned co-pending patent application Ser. No. 405,090.

The sequencing valve includes a valve body 10 having an inlet chamber 11 and an outlet chamber 12 separated by a valve port 13. The valve port is closed by a valve element 14 which is attached to one end of a sealed dashpot 15. The dashpot is filled with a liquid and is divided into two chambers 16 and 17 by an embodiment of the orifice device designated 18. The end of the sealed dashpot 15 opposite from the valve element 14 is movable axially in a manner to operate a ratcheting mechanism 19.

The sequencing valve is operated by deliberately changing the pressure in the line to which the valve is connected. A problem confronting sequencing valves operated by changes in line pressure is the possibility of unwanted operation due to a transient build-up of pressure in the line, generally referred to as a water hammer. Also, the time required to move the valve element of a sequencing valve may vary depending upon the pressure in the supply line.

The orifice device constituting the present invention compensates for variation in line pressure and also prevents operation of the sequencing valve when subjected to transient pressure surges or water hammer.

Operation of the orifice device is illustrated in FIGURES 5, 6 and 7. With reference to FIGURE 5, if the sequencing valve and orifice device are subjected to a transient pressure or pressure surge, the sudden rise in pressure will cause the flexure plate 5 to snap past center so that its orifice 6 is closed by the confronting wall of the fixed plate 1.

If the orifice device is subjected to a constant pressure, then the rate of flow through the orifice 6 is dependent upon the spacing between the flexure plate 5 and the confronting wall of the fixed plate 1 as shown in FIGURE 6. It should be noted that the orifice 6 is substantially smaller than the orifice 4 piercing the fixed plate 1 so that a pressure differential is established across the flexure plate 5. The flexure plate may be so designed that the amount of flexure is proportional to the line pressure; that is, pressure on the underside of the flexure plate as viewed in FIGURE 6 and the extent of flexure may be so predetermined that for a given pressure range, the actual flow through the orifices 6 and 4 will be constant. In fact, in actual tests, a constant flow of liquid was maintained in a pressure range of 40 p.s.i. to 140 p.s.i.

When the pressure above the flexible plate, as viewed in FIGURE 7, is higher than the pressure below the flexure plate, maximum flow of the fluid into the orifice device may occur without any throttling effect.

Reference is now directed to FIGURE 8. The construction here shown differs from the first described structure in that the shallow chamber 3 is provided with a shallow conical surface 20 and in this construction, the flexure plate designated 21 is normally flat. With this construction, the flexure plate does not function as a Bellville washer. The flexure plate 21 throttles by assuming an increased conical shape with increased pressure.

Reference is now directed to FIGURES 9, 10, 11 and 12. The construction here illustrated provides for a controlled flow in either direction through the modified orifice device. The orifice device illustrated in FIGURES 9 through 11 includes a frame 22 which supports a fixed plate 23 and an offset orifice 24. The two sides of the fixed plate 23 are confronted by flexure plates 25 which may be similar to the flexure plate 5 or the flexure plate 21. The flexure plates 25 have central orifices 26.

Operation of the orifice device shown in FIGURES 9 through 12 is the same as the first described device, except that flow is controlled in either direction, rather than in one direction.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. A pressure responsive flow control device comprising:
   a flat rigid circular disk portion having a first opening therethrough eccentric to its center;
   a resilient circular metal disk and means loosely holding said metal disk in normally spaced and concentric relation to one face of said rigid circular disk portion, said metal disk having a central opening smaller than said first opening, whereby the central portion of said metal disk may be resiliently flexed, by fluid pressure, toward said one face of said rigid disk to vary fluid flow through said openings and to a position where said central opening is completely closed by the flat central portion of said rigid disk, said one face comprising the bottom of a shallow circular recess in a rigid plate member, said metal disk being positioned in said recess; and a band encircling the periphery of said plate member and having a flange portion overlying the periphery of said recess to hold said metal disk therein.

2. A device as defined in claim 1 wherein said metal disk is normally flat.

3. A device as defined in claim 1 wherein said metal disk is normally of shallow conical shape with its apex extending away from said one face.

References Cited

UNITED STATES PATENTS

| | | | |
|---|---|---|---|
| 2,640,481 | 6/1953 | Conley | 137—525 X |
| 2,938,538 | 5/1960 | Allen | 137—504 |
| 3,003,596 | 10/1961 | Bourcier | 137—493 X |
| 3,109,451 | 11/1963 | Mihalakis | 137—517 X |
| 3,185,388 | 5/1965 | Siman | 137—512.15 X |

FOREIGN PATENTS

| | | |
|---|---|---|
| 941,334 | 4/1956 | Germany. |

ALAN COHAN, *Primary Examiner.*